United States Patent
Fomitchev et al.

(10) Patent No.: US 12,473,434 B2
(45) Date of Patent: Nov. 18, 2025

(54) COMPOSITION FOR LIQUID-BASED ADDITIVE MANUFACTURING

(71) Applicant: Cabot Corporation, Boston, MA (US)

(72) Inventors: Dmitry Fomitchev, Lexington, MA (US); Paul S. Palumbo, West Newton, MA (US); Jodi A. Bates, Chelmsford, MA (US); Xiaofeng Zhang, Shrewsbury, MA (US); Russell H. Lewis, Westford, MA (US); Eugene N. Step, Newton, MA (US); Andriy Korchev, Westford, MA (US); Joshua M. Wimble, Chelmsford, MA (US); Patrick Sargent, Medford, MA (US); Bjoern Schimmoeller, Oxford (GB)

(73) Assignee: Cabot Corporation, Boston, MA (US)

( * ) Notice: Subject to any disclaimer, the term of this patent is extended or adjusted under 35 U.S.C. 154(b) by 688 days.

(21) Appl. No.: 17/795,725

(22) PCT Filed: Feb. 3, 2021

(86) PCT No.: PCT/US2021/016379
§ 371 (c)(1),
(2) Date: Jul. 27, 2022

(87) PCT Pub. No.: WO2021/158636
PCT Pub. Date: Aug. 12, 2021

(65) Prior Publication Data
US 2023/0100957 A1   Mar. 30, 2023

Related U.S. Application Data

(60) Provisional application No. 63/088,142, filed on Oct. 6, 2020, provisional application No. 62/970,124, filed on Feb. 4, 2020.

(51) Int. Cl.
*C09C 1/30*   (2006.01)
*B29C 64/106*   (2017.01)
(Continued)

(52) U.S. Cl.
CPC .......... *C09C 1/3081* (2013.01); *B29C 64/106* (2017.08); *C08K 3/36* (2013.01);
(Continued)

(58) Field of Classification Search
CPC ....... C09C 1/3081; B29C 64/106; C08K 3/36; C08K 9/06; C08K 9/08; B33Y 10/00;
(Continued)

(56) References Cited

U.S. PATENT DOCUMENTS 6,177,232 B1   1/2001   Melisaris et al.
6,833,231 B2   12/2004  Moussa et al.
(Continued)

FOREIGN PATENT DOCUMENTS

EP   3040046 B1   4/2018
EP   3292168 B1 * 10/2024   .............. C08L 83/00
(Continued)

OTHER PUBLICATIONS

Macromol. Mater. Eng. 2017, 302, 1600553 (Year: 2017).*
(Continued)

*Primary Examiner* — John M Cooney
*Assistant Examiner* — Elizabeth Amato (57) ABSTRACT

Surface treated silica containing particles are combined with a resin to form a liquid prepolymer composition for use in additive manufacturing. A surface treatment on the silica containing particles may participate in polymerization of the composition. The silica containing particles may be colloidal silica or a silica polymer composite particle.

7 Claims, 3 Drawing Sheets

(51) Int. Cl.
*B33Y 10/00* (2015.01)
*B33Y 70/10* (2020.01)
*C08K 3/36* (2006.01)
*C08K 9/06* (2006.01)
*C08K 9/08* (2006.01)

(52) U.S. Cl.
CPC .................. *C08K 9/06* (2013.01); *C08K 9/08* (2013.01); *B33Y 10/00* (2014.12); *B33Y 70/10* (2020.01); *C01P 2006/22* (2013.01)

(58) Field of Classification Search
CPC ......... B33Y 70/10; B33Y 70/00; B33Y 40/20; C01P 2006/22
USPC ....................................................... 524/493
See application file for complete search history.

(56) References Cited

U.S. PATENT DOCUMENTS

| | | | |
|---|---|---|---|
| 8,202,502 B2 | 6/2012 | Floess et al. | |
| 8,466,245 B2 | 6/2013 | Langerbeins et al. | |
| 8,470,945 B2 | 6/2013 | Langerbeins et al. | |
| 8,895,145 B2 * | 11/2014 | Christopher | G03G 9/09725 428/405 |
| 9,568,847 B2 | 2/2017 | Fomitchev et al. | |
| 2004/0023145 A1 | 2/2004 | Moussa et al. | |
| 2004/0077768 A1 | 4/2004 | Greenwood | |
| 2006/0171872 A1 | 8/2006 | Adams | |
| 2008/0245260 A1 | 10/2008 | Campazzi et al. | |
| 2010/0160491 A1 | 6/2010 | Armes et al. | |
| 2012/0010361 A1 | 1/2012 | Urakawa et al. | |
| 2013/0029258 A1 | 1/2013 | Christopher et al. | |
| 2015/0344728 A1 | 12/2015 | Groenewolt et al. | |
| 2017/0333167 A1 | 11/2017 | Hagiwara et al. | |
| 2017/0349770 A1 | 12/2017 | Jung et al. | |
| 2018/0291255 A1 | 10/2018 | Southwell | |
| 2020/0102442 A1 | 4/2020 | He et al. | |
| 2020/0392272 A1 | 12/2020 | Suzuki | |

FOREIGN PATENT DOCUMENTS

| | | |
|---|---|---|
| JP | 2017/0186404 A | 10/2017 |
| WO | WO 2004/035474 A1 | 4/2004 |
| WO | WO 2016/071811 A1 | 5/2016 |
| WO | WO 2019/048963 A1 | 3/2019 |
| WO | WO 2019/074015 A1 | 4/2019 |

OTHER PUBLICATIONS

The International Search Report and the Written Opinion of the International Searching Authority, or the Declaration of International Application No. PCT/US2021/016379, mailed May 10, 2021.
Andrade, S.R., et al., "Numerical Simulation of Localized Cure of Thermosensitive Resin During Thermo Stereolithography Process (TSTL)", Journal of Applied Polymer Science, vol. 102, pp. 2777-2783 (2006).
Bagheri, Ali, et al., "Photopolymerization in 3D Printing", ACS Applied Polymer Materials, School of Chemical Sciences, 10.1021/acsapm.8b00165 (2019).
Dizon, John, et al., "Thermo-Mechanical and Swelling Properties of Three-Dimensional-Printed Poly (Ethylene Glycol) Diacrylate/Silica Nanocomposites", MRS Communications (2019), vol. 9, pp. 209-217.
Gurr, Matthias, et al., "Acrylic Nanocomposite Resins for Use in Stereolithography and Structural Light Modulation Based Rapid Prototyping and Rapid Manufacturing Technologies", Advanced Functional Materials, 2008, vol. 18, pp. 2390-2397.
Kraft, Daniela J., et al., "Conditions for Equilibrium Solid-Stabilized Emulsions", J. Phys. Chem. B 2010, vol. 114, pp. 10347-10356.
Liu, Haitao, et al., "Study on Nanosilica Reinforced Stereolithography Resin", Journal of Reinforced Plastics and Composites, vol. 29, No. 6, 2010, pp. 909-920.
Manapat, Jill Z., et al., "3D Printing of Polymer Nanocomposites via Stereolithography", Macromolecular Materials Engineering, 2017, vol. 302, 1600553, pp. 1-13.
Neibloom, Denise, et al., "Surfactant-Stabilized Spontaneous 3-(Trimethoxysily1) Propyl Methacrylate Nanoemulsions", DOI: 10.1021/acs.langmuir.9b03412, 2019.
Scarparo, M.A.F., et al., "Mechanisms of Carbon Dioxide Laser Stereolithography in Epoxy-Based Materials", Journal of Applied Polymer Science, vol. 62, pp. 491-500 (1996).
Van Der Wel, Casper, et al., "Preparation of Colloidal Organosilica Spheres through Spontaneous Emulsification", Langmuir 2017, vol. 33, pp. 8174-8180.
Weng, Zixiang, et al., "Structure-Property Relationship of Nano Enhanced Stereolithography Resin for Desktop Sla 3D Printer", Composites: Part A, vol. 88 (2016), pp. 234-242.
Xu, Guo Cai, et al., "Synthesis and Characterization of Silica Nanocomposite In Situ Photopolymerization", Journal of Applied Polymer Science, vol. 90, pp. 837-840 (2003).

* cited by examiner

Fig. 3D ns of PCT/US2021/
COMPOSITION FOR LIQUID-BASED ADDITIVE MANUFACTURING

This application is the national phase of PCT/US2021/016379, filed Feb. 3, 2021, which claims priority from U.S. Provisional Application No. 62/970,124, filed Feb. 4, 2020, and 63/088,142, filed Oct. 6, 2020.

BACKGROUND OF THE INVENTION

1. Field of the Invention

This invention relates to methods and compositions for performing liquid based additive manufacturing employing silica-based particles to produce a printed part and the resulting printed part.

2. Description of the Related Art

Stereolithography is a liquid-based additive manufacturing process in which a light, e.g., a UV laser or projected beam, is used to cure a layer of liquid photocurable resin. A reservoir of the curable resin is locally cured to form a layer of the final solid part. After each layer is scanned, the part-in-process is translated away from the light source by a small distance, e.g., a fraction of a millimeter, allowing the surface to be coated with a fresh layer of the photocurable resin. By repeating the process multiple times, a finished piece is gradually produced in a layer-by-layer fashion. In alternative methods such as continuous liquid interface production (CLIP) and digital light synthesis (DLS), material is added to the workpiece continuously rather than in a layer-by-layer fashion.

The photocurable resins typically used in these liquid-based additive manufacturing processes result in brittle plastics that may also lack desirable thermal properties or otherwise not be optimized for the end-use applications of the finished piece. Thus, it is desirable to have additives for the photocurable resins that can improve the mechanical properties and thermal stability of the cured polymer and confer other benefits on the finished piece or optimize manufacturing conditions.

SUMMARY OF THE INVENTION

In one embodiment, a method of forming a three-dimensional object comprises a) contacting a substrate with a reservoir of prepolymer composition, the prepolymer composition comprising a resin comprising monomers and oligomers of polymers selected from acrylates, methacrylates, vinyl polymers, olefins, silicones, and epoxies and silica-containing particles selected from i) 0.1-50 wt % colloidal silica particles having a particle size of 5 nm-600 nm treated with at least one surface treatment agent, and ii) 0.1-50 wt % silica-polymer composite particles having a particle size of 10 nm-3 microns and comprising colloidal silica particles treated with at least one surface treatment agent, wherein the surface treatment agent comprises an organopolysiloxane, an organosiloxane, an organosilane, a haloorganosilane, or an organosilazane, and wherein the prepolymer composition has a viscosity no more than 500 cP greater than the neat resin at a temperature of 25° C. and a shear rate of 100 s$^{-1}$; b) selectively exposing the prepolymer composition imagewise to actinic radiation to form solid polymer at the substrate and having a build surface parallel to the substrate, the solid polymer being a sequential portion of the three-dimensional object; c) contacting the build surface with the prepolymer composition; d) selectively exposing the prepolymer composition to actinic radiation to increase the mass of the solid polymer, the additional polymer being a subsequent sequential portion of the three-dimensional object and e) repeating steps c) and d) until the three dimensional object is formed.

The surface treatment agent may include a hydroxy-substituted or terminated siloxane oligomer having 7 to 14 mers or a cyclic siloxane having 4-14 silicon atoms in the ring, e.g., a dimethylsiloxane oligomer.

Alternatively or in addition, the surface treatment agent may include $R^1Si[(OR^2)_x R^3_{3-x}]$ wherein $R^1$ is selected from the group consisting of $C_1$-$C_{30}$ branched and straight chain alkyl, alkenyl, and $C_3$-$C_{10}$ cycloalkyl, $C_6$-$C_{10}$ aryl, and $R^4Q$, where $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3, hexamethyldisilazane, or dimethyldichlorosilane. For example, the surface treatment agent may include $[R^3_{3-x}(OR^2)_x]SiR^4Q$ and n=6-10. Alternatively or in addition, the surface treatment agent may include $[R^3_{3-x}(OR^2)_x]SiR^4Q$ and Q is an epoxy or thiol group.

Alternatively or in addition, the surface treatment agent may include a polysiloxane oligomer or co-oligomer of at least one group $[R^3_{3-x}(OR^2)_x]SiR^4Q$ having a viscosity of 4-3500 cSt, wherein $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3. For example, Q may be a substituted or unsubstituted vinyl, allyl, acrylate ester, or methacrylate ester group, and/or the polysiloxane oligomer or co-oligomer has a viscosity of 500-3500 cSt.

Alternatively or in addition, the silica-containing particles are silica-polymer composite particles, which may include a plurality of silica particles and a polymer matrix, wherein the silica particles are surface-modified with a first hydrophobizing agent comprising $[R^3_{3-x}(OR^2)_x]SiR^4Q$, wherein $R^4Q$, where $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3.

In any of these embodiments, coating the prepolymer composition onto the cross-section may include translating the substrate along an axis normal to the cross-section. Alternatively or in addition, steps c) and d) may be performed in a stepwise manner or concurrently, such that the prepolymer composition is coated onto the cross-section while the prepolymer composition is polymerizing.

A polymer composite may be prepared by any combination of the embodiments described above.

In another embodiment, a method of preparing surface treated silica particles comprises providing an aqueous silica dispersion comprising 5-70% colloidal silica particles having an average particle size of 5-600 nm and a first BET surface area and having a pH of about 8 to about 11; combining the aqueous silica dispersion with a) 0.4-10 molecules/nm$^2$ (based on the first BET surface area) of an alkoxysilane treating agent having the formula $[R^3_{3-x}(OR^2)_x]SiR^4Q$ or b) a polysiloxane oligomer or co-oligomer of at least one group $R^5Si[(OR^2)_x R^3_{3-x}]$ and having a viscosity of 4 to 3500 cSt in an amount equivalent to 0.5-10 $R^5$ groups/nm$^2$ (based on the first BET surface area) to provide a reaction mixture comprising no more than 50 wt % of an organic solvent, wherein $R^5$ is selected from the group consisting of $C_1$-$C_{10}$ branched and straight chain alkyl, alkenyl, and $C_3$-$C_{10}$ cycloalkyl, $C_6$-$C_{10}$ aryl, and $R^4Q$, $R^2$ and $R^3$ are independently methyl or ethyl, x is 1, 2, or 3, $R^4$ is an alkyl linker with the general formula $C_nH_{2n}$, where n=0-10, and Q is an epoxy, thiol, or a substituted or unsubstituted vinyl, allyl, acrylate ester, or methacrylate ester group; and either a) drying the surface treated silica particles directly from the reaction mixture to form a powder or b) solvent exchanging the surface treated silica particles into a solvent containing a mixture of an organic solvent and water, wherein the amount of water is no greater than the amount of water present in an azeotropic mixture of the organic solvent and water. The reaction mixture may have a pH of about 8 or more. Alternatively or in addition, the alkoxysilane treating agent may have the formula $[R^3{}_{3-x}(OR^2)_x]SiR^4Q$, wherein a) n=6-10, b) Q is epoxy or thiol, or both. Alternatively or in addition, $R^5$ may be $R^4Q$, and/or Q is or a substituted or unsubstituted vinyl, acrylate ester, or methacrylate ester group. The viscosity of the polysiloxane oligomer may be 500-3500 cSt.

In another embodiment, a particle composition comprises colloidal silica particles surface treated with a polysiloxane oligomer or co-oligomer of at least one group $R^5Si[(OR^2)_xR^3{}_{3-x}]$, wherein $R^5$ is selected from the group consisting of $C_1$-$C_{10}$ branched and straight chain alkyl, alkenyl, and $C_3$-$C_{10}$ cycloalkyl, and $C_6$-$C_{10}$ aryl, $R^2$ and $R^3$ are independently methyl or ethyl, and x is 1, 2, or 3, and $R^4Q$, $R^4$ is an alkyl linker with the general formula $C_nH_{2n}$, where n=0-10, and Q is an epoxy, thiol, or a substituted or unsubstituted vinyl, allyl, acrylate ester, or methacrylate ester group. The polysiloxane oligomer or co-oligomer may have a viscosity of 4 to 3500 cSt. Alternatively or in addition, $R^5$ may be $R^4Q$, where Q is a substituted or unsubstituted vinyl, acrylate ester, or methacrylate ester group and the polysiloxane oligomer has a viscosity of 500-3500 cSt. The particle composition may be in the form of a dry powder.

In another embodiment, a prepolymer composition for three-dimensional printing via stereolithography, continuous liquid interface production, or digital light synthesis, comprises a resin comprising monomers and oligomers of polymers selected from acrylates, methacrylates, vinyl polymers, olefins, silicones, and epoxies and a silica-containing particle selected from i) 0.1-50 wt % colloidal silica particles having a particle size of 5 nm-600 nm treated with at least one surface treatment agent, and ii) 0.1-50 wt % silica-polymer composite particles having a particle size of 10 nm-3 microns and comprising colloidal silica particles treated with at least one surface treatment agent, wherein the surface treatment agent comprises an organopolysiloxane, an organosiloxane, an organosilane, a haloorganosilane, or an organosilazane, and wherein the prepolymer composition has a viscosity no more than 500 cP greater than the neat resin at a temperature of 25° C. and a shear rate of 100 $s^{-1}$;

The surface treatment agent may include a hydroxy-substituted or terminated siloxane oligomer having 7 to 14 mers or a cyclic siloxane having 4-14 silicon atoms in the ring. The siloxane oligomer may be a dimethylsiloxane oligomer.

Alternatively or in addition, the surface treatment agent may include $R^1Si[(OR^2)_xR^3{}_{3-x}]$ wherein $R^1$ is selected from the group consisting of $C_1$-$C_{30}$ branched and straight chain alkyl, alkenyl, and $C_3$-$C_{10}$ cycloalkyl, $C_6$-$C_{10}$ aryl, and $R^4Q$, where $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3, hexamethyldisilazane, dimethyldichlorosilane. For example, the surface treatment agent may include $[R^3{}_{3-x}(OR^2)_x]SiR^4Q$ where n=6-10 and/or Q is an epoxy or thiol group.

Alternatively or in addition, the surface treatment agent may include a polysiloxane oligomer or co-oligomer of at least one group $[R^3{}_{3-x}(OR^2)_x]SiR^4Q$ having a viscosity of 4-3500 cSt, wherein $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3. For example, Q may be a substituted or unsubstituted vinyl, allyl, acrylate ester, or methacrylate ester group and/or the polysiloxane oligomer or co-oligomer may have a viscosity of 500-3500 cSt.

Alternatively or in addition, the silica-containing particles may be silica-polymer composite particles, which may include a plurality of silica particles and a polymer matrix, wherein the silica particles are surface-modified with a first hydrophobizing agent comprising $[R^3{}_{3-x}(OR^2)_x]SiR^4Q$, wherein $R^4Q$, where $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

In FIGS. 2A and 2B, the silica was dispersed in the uncured resin as a powder. In FIGS. 2C and 2D, the silica was dispersed in the uncured resin as a dispersion in an alcohol-based solvent.

DETAILED DESCRIPTION OF THE INVENTION

In one embodiment, a prepolymer composition, comprises a resin comprising monomers and oligomers of polymers selected from acrylates, methacrylates, vinyl, allyl, silicones, and epoxies; and 0.1-50 wt % colloidal silica particles having a particle size of 5 nm-600 nm surface-treated with a silane agent comprising a group that can co-polymerize with at least a portion of the monomers and oligomers, wherein the prepolymer composition has a viscosity of no more than 500 cP greater than that of the neat resin at a temperature of 25° C. and a shear rate of 100 $s^{-1}$, for example, no more than 450 cP greater or no more than 350 cP greater. For example, the colloidal silica particles may be surface treated with methacryloxypropyltrimethoxy silane (MPS). Alternatively or in addition, the colloidal silica particles may be surface-treated with a monofunctional silane agent via which a hydrophobic functionality becomes attached to the surface; however, the hydrophobic functionality need not co-polymerize with the monomers or the oligomers.

Use of such particles can increase one or more of the tensile modulus, tensile strength, tensile elongation, and/or flexural modulus of a printed part produced by liquid-based additive manufacturing processes in comparison to the neat resin. Such benefits may be realized independently of the orientation of the workpiece with respect to the axis along which polymer is deposited during manufacturing. Other mechanical properties that may be affected include but are not limited to flexural modulus, Young's modulus, and low temperature brittleness.

The colloidal silica may be produced by a sol-gel process. Colloidal silica particles are often non-aggregated, individually discrete (primary) particles, which typically are spherical or nearly spherical in shape, but can have other shapes (e.g., shapes with generally elliptical, square, or rectangular cross-sections). Preferably, non-aggregated colloidal silicas are employed for the embodiments provided herein. Colloidal silicas are commercially available or can be prepared by known methods from various starting materials (e.g., wet-process type silicas). Colloidal silica particles are typically fabricated in a manner similar to precipitated silica particles (i.e., they are coagulated from an aqueous medium) but remain dispersed in a liquid medium (often water alone or with a co-solvent and/or stabilizing agent). Silica particles can be prepared, for example, from silicic acid derived from an alkali silicate solution having a pH of about 9 to about 11, wherein the silicate anions undergo polymerization to produce discrete silica particles having the desired average particle size in the form of an aqueous dispersion. Typically, the colloidal silica will be available as a sol, which is a dispersion of colloidal silica in a suitable solvent, most often water alone or with a co-solvent and/or stabilizing agent. See, e.g., Stoeber, et al., "Controlled Growth of Monodisperse Silica Spheres in the Micron Size Range," *Journal of Colloid and Interface Science,* 26, 1968, pp. 62-69, Akitoshi Yoshida, Silica Nucleation, Polymerization, and Growth Preparation of Monodispersed Sols, in *Colloidal Silica Fundamentals and Applications*, pp 47-56 (H. E. Bergna & W. O. Roberts, eds., CRC Press: Boca Raton, Florida, 2006), and Iler, R. K., *The Chemistry of Silica*, p 866 (John Wiley & Sons: New York, 1979). Non-limiting examples of commercially available colloidal silicas suitable for use in liquid based additive manufacturing include SNOWTEX® products from Nissan Chemical, LUDOX® products available from W.R. Grace & Co., BINDZIL® products available from AkzoNobel, KLEBOSOL® products available from Merck KGaA, NexSil™ and NexSil A™ series products available from Nyacol Nanotechnologies, Inc., Quartron™ products available from Fuso Chemical, and Levasil® products available from AkzoNobel.

Colloidal silica particles may have an average primary particle size from about 5 to as much as about 500-600 nm. Primary particle size may be measured by transmission electron microscopy of at least 2000 particles or, for non-aggregated particles, by disc centrifuge sedimentation. Silica with an average primary particle size up to about 20-40 nm in size, for example, from about 5 to about 15 nm, from about 10 to about 20 nm, from about 15 to about 25 nm, or from about 25 to about 35 nm in size may be preferred in embodiments where transparency is desired. Larger silica based particles, for example, from about 5 nm to about 200 nm, from about 20 to about 150 nm, or from about 50 to about 100 nm, may be used to provide mechanical reinforcement and enhance properties such as tensile and flexural strength and tensile modulus. Still larger particles may be used to impart rigidity and/or hardness to the printed part. Particle size may be measured by dynamic light scattering. Generally, the colloidal silica particles are non-aggregated, although they may be low structure aggregates having fewer than 5, preferably only 2 or 3, primary particles.

The term "colloidal dispersion" as used herein refers to a dispersion of colloidal particles (e.g., particles having an average primary particle size of about 600 nm or less). The colloidal stability of such a dispersion prevents any substantial portion of the particles from irreversibly agglomerating. Agglomeration of particles can be detected by an increase in the average overall particle size. In this regard, the colloidal dispersion can be stabilized or non-stabilized. The term "stabilized" as used herein refers to the addition of a stabilizing ingredient, for example, an acid, base, or other stabilizing agent known in the art in an amount sufficient to increase the stability of the dispersion. Methods of stabilizing colloidal dispersions are known in the art. Whether stabilized or not, the colloidal dispersion used in conjunction with the invention preferably has a degree of colloidal stability such that the average overall particle size of the colloidal particle as measured by DLS does not change over a period of 3 weeks or more (e.g., 4 weeks or more, or even 5 weeks or more), more preferably 6 weeks or more (e.g., 7 weeks or more, or even 8 weeks or more), most preferably 10 weeks or more (e.g., 12 weeks or more, or even 16 weeks or more). Aqueous colloidal silica dispersions are commercially available, generally at a slightly basic pH (e.g., about 9-10), but are also available as neutral and acidic dispersions.

The colloidal silica particles may be surface treated with a surface treatment agent. Exemplary treatment methods are described in U.S. Pat. No. 7,811,540, U.S. Ser. No. 10/407,571, and U.S. Pat. No. 8,435,474, the entire contents of all of which are incorporated herein by reference. The surface treatment agent changes, in whole or in part, the surface chemistry of the silica from silanol groups to the chemistry provided by the agent. Without wishing to be bound by any particular theory, it is believed that the surface treatment agent reacts with the surface hydroxyl groups on the surface of the colloidal particles to effectively replace the hydrophilic groups with other chemical groups. The type and degree of charge imparted to the silica particles will vary depending on the type and amount of treating agent used and may be varied depending on the type of resin used for liquid based additive manufacturing. In some embodiments, the surface treatment agent is present at a level from 0.4 to 10 molecules/nm$^2$, for example, from 1 to 6 molecules/nm$^2$ or from 2 to 5 molecules/nm$^2$ (surface area measured by the Brunauer-Emmett-Teller (BET) method). The number of molecules at the surface may be calculated from the amount of carbon in the surface treated particles or by CP/MAS NMR, discussed in more detail below. Many surface-treatment groups impart hydrophobicity to the surface by replacing surface silanols with other, more hydrophobic, groups. The hydrophobicity, as measured by methanol wetting number, may be from 0 to 85, for example, less than 50 or less than 40.

The surface treatment of the colloidal silica generates various patterns of substituted silicon atoms attached to the surface of the silica particles or attached indirectly to the surface of the silica particles. These substitution patterns have been referred to in the literature as M sites, D sites, T sites, and Q sites. See, for example, Sindorf, Dean William, "Silicon-29 and Carbon-13 CP/MAS NMR Studies of Silica Gel and Bonded Silane Phases," Department of Chemistry, Colorado State University, Fort Collins, Colo., 1982. The correlation of the M sites, D sites, T sites, and Q sites to the resonance signals in the CP/MAS $^{29}$Si NMR spectrum also is discussed in Maciel, G., Sindorf, D. W., *J. Am. Chem. Soc.* 102:7607-7608 (1980), Sindorf, D. W., Maciel, G., *J. Phys. Chem.*, 86: 5208-5219 (1982), and Sindorf, D. W., Maciel, G., *J. Am. Chem. Soc.*, 105: 3767-3776 (1983).

As used herein, T1 sites correspond to a silicon atom originating from an alkoxysilane compound having one bond to oxygen atoms further bonded to silicon atoms, at least one of which is on the metal oxide particle surface, two bonds to oxygen atoms comprising a silanol (Si—OH) group, and one bond to a carbon atom. T2 sites are represented by formula (I): $R^1$—Si(OH)$_2$—(OSi—P$^1$) wherein the group $R^1$ is as defined herein for the alkoxysilane compound, and P$^1$ represents a bond to a silicon atom on a particle surface and/or a silicon atom of another silane-containing molecule. Si atoms corresponding to T1 sites have been correlated with the resonance signals with chemical shifts in the range from −40 ppm to −50 ppm in the CP/MAS $^{29}$Si NMR spectrum, wherein the chemical shift in ppm is measured relative to the standard tetramethylsilane.

As used herein, T2 sites correspond to a silicon atom originating from an alkoxysilane compound having two bonds to oxygen atoms further bonded to silicon atoms, at least one of which is on the metal oxide particle surface, one bond to an oxygen atom comprising a silanol (Si—OH) group, and one bond to a carbon atom. T2 sites are represented by formula (I): $R^1$—Si(OH)—(OSi—P$^1$)(OSiP$^2$) wherein the group $R^1$ is as defined herein for the alkoxysilane compound, and P$^1$ and P$^2$ independently represent a bond to a silicon atom on a particle surface and/or a silicon atom of another silane-containing molecule. Si atoms corresponding to T2 sites have been correlated with the resonance signals with chemical shifts in the range from −56 ppm to −59 ppm in the CP/MAS $^{29}$Si NMR spectrum, wherein the chemical shift in ppm is measured relative to the standard tetramethylsilane.

As used herein, T3 sites correspond to a silicon atom originating from an alkoxysilane compound having three bonds to an oxygen atom further bonded to silicon atoms. At least one of the silicon atoms is a silicon atom on a particle. The sites are represented by the formula (II): $R^1$—Si(OSi—P$^1$)(OSi—P$^2$)(OSi—P$^3$) wherein the group $R^1$ is as herein defined for the alkoxysilane compound and wherein P$^1$, P$^2$, and P$^3$ independently represent a bond to a silicon atom on a particle surface and/or a silicon atom of another silane-containing molecule. Si atoms corresponding to T3 sites have been correlated with the resonance signals with chemical shifts in the range from −65 ppm to −69 ppm in the CP/MAS $^{29}$Si NMR spectrum, wherein the chemical shift in ppm is measured relative to the standard tetramethylsilane.

As used herein, M sites correspond to a silicon atom originating from a silazane compound having three bonds to a carbon atom and one bond to an oxygen atom further bonded to a silicon atom which in turn is bonded to a surface functional group of a silica particle, upon reaction with the surface of the silica particle. M sites are represented by formula (III): R'R''R'''—Si—OP wherein R', R', and R''' are $C_1$-$C_{10}$ groups bonded to the silicon atoms in the silazane compound. Si atoms corresponding to M sites have been correlated with the resonance signals with chemical shifts in the range from +7 ppm to +18 ppm in the CP/MAS $^{29}$Si NMR spectrum, wherein the chemical shift in ppm is measured relative to the standard tetramethylsilane.

As defined herein, T2 is the integrated intensity of a peak having a chemical shift in the CP/MAS $^{29}$Si NMR spectrum centered within the range of −56 ppm to −59 ppm. T3 is the integrated intensity of a peak having a chemical shift in the CP/MAS $^{29}$Si NMR spectrum centered within the range of −65 ppm to −69 ppm. Total T is the integrated intensity of the CP/MAS $^{29}$Si NMR spectrum from −40 ppm to −70 ppm. M is the integrated intensity of a peak having a chemical shift in the CP/MAS $^{29}$Si NMR spectrum centered within the range of +7 ppm to +18 ppm. The intensity of a peak refers to the maximum peak height of the signal at that approximate location or the area of the peak occurring within the recited ranges, as calculated using standard calculation methods well known to those skilled in the art.

Suitable surface treatment agents include organopolysiloxanes, organosiloxanes, organosilanes, haloorganosilanes, organosilazanes and other agents that react with and/or replace silanol groups on the surface of the silica particles. For example, alkoxysilanes having the formula $R^1Si[(OR^2)_xR^3_{3-x}]$ wherein $R^1$ is selected from the group consisting of $C_1$-$C_{30}$ branched and straight chain alkyl, alkenyl, and $C_3$-$C_{10}$ cycloalkyl, and $C_6$-$C_{10}$ aryl, $R^2$ and $R^3$ are independently methyl or ethyl, and x is 1, 2, or 3, may be employed. Preferable alkoxysilanes include trialkoxysilanes such as octyltrimethoxysilane and octyltriethoxysilane. Alternative surface treating agents include hexamethyldisilazane, dimethyldichlorosilane, and hydroxyl-substituted or terminated polysiloxanes, especially siloxane oligomers, including mono- or di-hydroxyl terminated oligomers, having 7 to 14 mers or cyclic siloxanes having 4-14 silicon atoms in the ring.

Preferably, or in addition to other treating agents, the surface treating agent can react with the monomers or oligomers of the liquid resin. For example, alkoxysilanes having the formula $[R^3_{3-x}(OR^2)_x]SiR^4Q$ (i.e., $R^1$=$R^4Q$), where $R^2$, $R^3$, and x are defined above, $R^4$ is an alkyl linker with the general formula $C_nH_{2n}$, where n=0-10, and Q is an epoxy, thiol, or a substituted or unsubstituted vinyl, allyl, acrylate ester, or methacrylate ester group. Alkoxysilanes in which n=6-10, e.g., 8-methacryloxyoctyltrimethoxysilane (MOS) or 8-methacryloxyoctyltriethoxysilane, can provide even greater benefits for the mechanical strength of printed parts than alkoxysilanes in which n=0-5, as the longer linger group may facilitate dispersion of the treated particle in the resin. Exemplary alkoxysilanes include but are not limited to (3-acryloxypropyl)trimethoxysilane, (3-acryloxypropyl)triethoxysilane, 3-methacryloxypropyltrimethoxysilane (MPS), methacryloxypropyltriethoxysilane, 8-methacryloxyoctyltrimethoxysilane (MOS), 8-methacryloxyoctyltriethoxysilane, methacryloxymethyltrimethoxysilane, methacryloxymethyltriethoxysilane, (3-acryloxypropyl)methyldimethoxysilane, methacryloxypropylmethyldimethoxysilane, methacryloxypropyldimethylethoxysilane, 3-butenyltrimethoxysilane, 3-butenyltriethoxysilane, 4-pentenyltriethoxysilane, 4-pentenyltrimethoxysilane, 5-hexenetrimethoxysilane, 5-hexenemethyldimethoxysilane, allyltrimethoxysilane, trimethoxy (7-octen-1-yl)silane, 3-(trimethoxysilyl)propyl acrylate, (3-glycidoxypropyl) trimethoxysilane, trimethoxyoxy[2-(7-oxabicyclo[4.1.0]hept-3-yl)ethyl] silane, 3-mercaptopropyltrimethoxysilane, 3-mercaptopropyltriethoxysilane, and 3-methacryloxypropyldimethylmethoxysilane. Alternatively or in addition, short chain polysiloxane oligomers and co-oligomers of any of these alkoxy silanes, for example having a viscosity of 4-3500 cSt, for example, 4-10 cSt, 4-20 cSt, may be employed. Such oligomers have numerous alkoxy side chains that can serve as a point of attachment to the silica surface. Especially suitable oligomers and co-oligomers may be produced with $R^5Si[(OR^2)_xR^3_{3-x}]$ wherein $R^5$ is selected from the group consisting of $C_1$-$C_{10}$ branched and straight chain alkyl, alkenyl, and $C_3$-$C_{10}$ cycloalkyl, and $C_6$-$C_{10}$ aryl, $R^2$ and $R^3$ are independently methyl or ethyl, and x is 1, 2, or 3, and $R^4Q$, where $R^4$ and $Q$ are as defined above, preferably where Q is vinyl, acrylate ester, or methacrylate ester. Exemplary polysiloxane oligomers include oligomeric hydrosylates of vinyltrimethoxysilane, (3-acryloxypropyl) trimethoxysilane, vinyltriethoxysilane, methacryloxypropyl trimethoxysilane, octyltriethoxysilane, methyltrimethoxysilane, propyltriethoxysilane, and copolymers of any of these and are commercially available from Gelest. In one embodiment, the polysiloxane oligomer is an oligomeric hydrosylate of methacryloxypropyl trimethoxysilane having a viscosity of 500 to 3500 cSt. Where a polysiloxane oligomer is employed, it may be present on the surface in an amount sufficient to provide 0.4 to 10 groups $R^5/nm^2$, for example, from 1 to 6 groups $R^5/nm^2$ or from 2 to 5 groups $R^5/nm^2$ An exemplary method of surface treating colloidal silica with an alkoxysilane having a group Q or polysiloxane oligomer as described above is via an aqueous reaction mixture. The reaction mixture is incubated with an appropriate amount of the Q-containing alkoxysilane or oligomer and dried. The amount of the Q-containing alkoxysilane or oligomer is sufficient to attach about 0.4-10 Q groups/$nm^2$ of silica. For alkoxysilane monomers, this corresponds to 0.4-10 molecules/$nm^2$ of silica. The amount of silica in the aqueous reaction mixture is about 5-70 wt. % based on the total weight of the reaction mixture. Typically, the amount of silica in the reaction mixture will be about 20 wt. % or more (e.g., about 25 wt. % or more) or even about 35 wt. % or more (e.g., about 40 wt. % or more). Thus, the amount of silica in the reaction mixture can be about 10-65 wt. % (e.g., about 15-60 wt %.) or about 20-50 wt. % (e.g., about 25-45 wt. %).

The reaction mixture comprises no more than about 50 wt. % of an organic solvent, for example, no more than about 20 wt. % of an organic solvent. Suitable organic solvents include water-miscible organic solvents, preferably in which the alkoxysilane is at least partially soluble. Non-limiting examples of water-miscible organic solvents include alcohols (e.g., methanol, ethanol, isopropanol, etc.), tetrahydrofuran, acetone, and similar solvents. The reaction mixture is typically basic, preferably with a pH from 8-11, e.g., from 8.5 to 10 or from 9 to 9.5. Alternatively, the reaction mixture may be acidic, e.g., with a pH from 2-6, or from 4 to 5.5.

An aqueous colloidal silica dispersion and the Q-containing alkoxysilane or oligomer can be combined to provide a reaction mixture by any suitable method. In one embodiment, the Q-containing alkoxysilane or oligomer and the aqueous colloidal silica dispersion are combined with mixing or agitation to facilitate contact between the silica particles and the treating agent. Mixing or agitation can be accomplished by any method, such as by using a mixing or agitating device. Examples of suitable devices include paddle stirrers, radial flow or axial flow impellers, homogenizers, ball mills, and similar devices. The Q-containing alkoxysilane or oligomer may be added all at once or in two or more aliquots which are each allowed to react separately.

The reaction mixture can be maintained at any temperature that allows the Q-containing alkoxysilane or oligomeric treating agent to react with the colloidal silica (e.g., react with the silanol groups on the surface of the silica particles). Not wishing to be bound by theory, it is hypothesized that under the reaction conditions the alkoxysilane groups will hydrolyze to produce silanols which then condense with silanols on the surface of the silica and/or other molecules of the hydrolyzed treating agent. As a result, the surface of the silica may contain oligomers and polymers of the hydrolyzed alkoxysilane or siloxane oligomer in addition to single molecules attached to the surface. Generally, the reaction mixture is maintained at a temperature of about 5-100° C., such as about 15-80° C., or about 20-70° C., for about 5 minutes or longer (e.g., about 30 minutes or longer), or even about 60 minutes or longer (e.g., about 120 minutes or longer, or about 180 minutes or longer). Longer reaction times (e.g., 5-10 hours, 10-20 hours, or even greater than 20 hours, e.g., 20-30 hours) may be required depending on the particular reaction conditions (e.g., temperature and concentration of reagents) used.

The surface treated silica particles can be isolated and dried from the reaction mixture. The terms "dry" and "dried" as used herein with reference to the surface treated silica particles means substantially or completely free of the liquid components of the reaction mixture, including water and other liquid-phase solvents, reactants, by-products, and any other liquid component that might be present. Similarly, the term "drying" as used herein refers to the process of removing the liquid components of the reaction mixture from the surface treated silica particles.

The surface treated silica particles can be isolated from the reaction mixture prior to drying, or the surface treated silica particles can be dried directly from the reaction mixture. Any suitable method can be used to isolate the surface treated silica particles from the reaction mixture. Suitable methods include filtration, centrifugation, and other methods known to those of skill in the art. The particles may be purified through diafiltration or dialysis. Alternatively, the surface treated silica particles may be used in dispersion form. For example, azeotropic distillation techniques may be employed to solvent exchange the surface treated silica particles into organic solvents such as alcohols.

The surface treated silica particles can be dried after isolation from the reaction mixture, or directly from the reaction mixture, by evaporating the volatile components of the reaction mixture from the surface treated silica particles. Evaporation of the volatile components of the reaction mixture can be accomplished using heat- and/or reduced atmospheric pressure. When heat is used, the surface treated silica particles can be heated to any suitable drying temperature, for example, using an oven or other similar device. The drying temperature chosen will depend, at least in part, on the specific components of the reaction mixture that require evaporation. Typically, the drying temperature will be about 40° C. or higher (e.g., about 50° C. or higher) such as about 70° C. or higher (e.g., about 80° C. or higher) or even about 120° C. or higher (e.g., about 130° C. or higher). Thus, the drying temperatures fall generally within the range of about 40-250° C. (e.g., about 50-200° C.), such as about 60-200° C. (e.g., about 70-175° C.), or about 80-150.° C. (e.g., about 90-130° C.).

The surface treated silica particles can be dried at any pressure that will provide a useful rate of evaporation. When drying temperatures of about 120° C. and higher (e.g., about 120-150° C.) are used, drying pressures of about 125 kPa or less (e.g., about 75-125 kPa) are suitable. At drying temperatures lower than about 120° C. (e.g., about 40-120° C.), drying pressures of about 100 kPa or less (e.g., about 75 kPa or less) are useful. Of course, reduced pressure (e.g., pressures of about 100 kPa or less, 75 kPa or less, or even 50 kPa or less) can be used as a sole method for evaporating the volatile components of the reaction mixture.

The surface treated silica particles also can be dried by other methods. For example, spray drying can be used to dry the surface treated silica particles. Spray drying involves spraying the reaction mixture, or some portion thereof, comprising the surface treated silica particles as a fine mist into a drying chamber, wherein the fine mist is contacted with hot air causing the evaporation of volatile components of the reaction mixture. Alternatively, the surface treated silica particles can be dried by lyophilization, wherein the liquid components of the reaction mixture are converted to a solid phase (i.e., frozen) and then to a gas phase by the application of a vacuum. For example, the reaction mixture comprising the surface treated silica particles can be brought to a suitable temperature (e.g., about $-20°$ C. or less, or about $-10°$ C. or less, or even $-5°$ C. or less) to freeze the liquid components of the reaction mixture, and a vacuum can be applied to evaporate those components of the reaction mixture to provide dry hydrophobic silica particles.

Alternatively or in addition, the colloidal silica particles may be modified with siloxane surface treating agents as described in U.S. Pat. Nos. 8,895,145 and/or 6,830,811, the entire contents of both of which are incorporated herein by reference, or with other siloxanes using methods known to those of skill in the art.

Alternatively or in addition, silica-polymer composite particles may be employed in the prepolymer compositions for liquid based additive manufacturing. Exemplary silica-polymer composite particles include those described in U.S. Pat. No. 9,568,847, US2010160491, US20190264127, the contents of all of which are incorporated herein by reference, and other methods known to those of skill in the art which result in silica-polymer composite particles having silica exposed at at least a portion of their surfaces.

For example, in U.S. Pat. No. 9,586,847, silica-polymer composite particles are produced by combining a first hydrophobizing agent and a colloidal silica dispersion. Any of the colloidal silicas described herein for hydrophobization and subsequent use in liquid based additive manufacturing methods may be used to produce silica-polymer composite particles. For liquid based additive manufacturing applications, the first hydrophobizing agent preferably has the formula $[R^3{}_{3-x}(OR^2)_x]SiR^4Q$, where $R^2$, $R^3$, $R^4$, $Q$ and $x$ are defined above. Suitable first hydrophobizing agents include the exemplary alkoxysilanes listed in connection with the description of $[R^3{}_{3-x}(OR^2)_x]SiR^4Q$ above and others known to those of skill in the art. The silica particles are incubated with the first hydrophobizing agent, following which the first hydrophobizing agent is polymerized via addition of an appropriate initiator. The resulting silica-polymer composite particles have groups Q at their surfaces. Alternatively or in addition, the silica particles may be surface treated with a surface-treatment agent using any of the surface treatment agents described above prior to or, for silane treating agents, at the same time as the first hydrophobizing agent.

Silica-polymer composite particles may be surface treated using any of the surface-treatment agents described above. For example, they may be treated with the surface treatment agents described above for colloidal silica. Preferred surface treatment agents for the silica-polymer composite particles are those with a group Q, for example, a methacryloxy, acryloxy or vinyl group as described above.

The particle composition can be formulated as a dry particle composition (e.g., a dry powder) or as a dispersion comprising the silica-based (colloidal silica or silica-polymer composite) particles. The dispersion can comprise any suitable solvent, e.g., water alone or with a co-solvent, treating agents, or additives of any type commonly used in dispersions of treated silica particles. Alternatively or in addition, the dispersion may comprise silica-based particles dispersed in an oligomer of the resin used in the liquid based additive manufacturing process or in a suitable diluent of the resin. As shown in the Examples, combining a solvent dispersion of silica-based particles with liquid resins for additive manufacturing promotes dispersion quality. Without being bound by any particular theory, it is believed that mixing a well-dispersed solvent dispersion into the resin reduces or avoids the shear required to achieve complete dispersion of the silica-based particles in powder form into the resin. Any suitable solvent may be employed. Preferably, the solvent is also a good solvent for the resin being employed for the liquid based additive manufacturing process. Exemplary solvents include polar solvents such as alcohols (e.g., methanol, ethanol, isopropanol, etc.), tetrahydrofuran, and acetone.

The resin may be any resin suitable for stereolithography, CLIP, DLS, or other liquid based additive manufacturing processes. Typical classes of resins include free-radical curable resins such as methacrylate resins, epoxy and oxetane resins, and reactive resins such as hydroxyl-containing resins such as hydroxyl terminated polyethers, polyesters, and polyurethanes. Alternatively, the reactive resins may be terminated with a vinyl, acrylate, or methacrylate group (e.g., methacryl-terminated polyurethanes). These resin classes may be used alone or in any combination with one another. Silicone resins may be used as well.

The prepolymer composition may further include an initiator, for example, a cationic initiator or a free radical initiator, or both, depending on the type of resin. A sensitizer, which increases light yield during polymerization, may also be used. One of skill in the art will easily select appropriate initiator for use with the resin in the prepolymer composition. Resins and initiators suitable for use with the silica and silica-polymer composite particles (collectively, "silica-based particles") described herein include those in U.S. Pat. Nos. 5,972,563 and 9,457,515, the entire contents of both of which are incorporated herein by reference.

Additional components that may be useful in prepolymer compositions for liquid based additive manufacturing include impact modifiers, rheology modifiers, dyes, pigments, antioxidants, wetting agents, free-radical chain transfer agents, leveling agents, defoamers, surfactants, additional fillers besides the silica-based particles provided herein, and other additives known to those of skill in the art.

Additive manufacturing has long been used to produce intricately shaped polymer articles. Important properties of the resulting articles vary by end use application but may include mechanical properties such as tensile, compression, or shear strength, chemical resistance, and thermal properties. In addition, the uncured resin systems used for liquid based additive manufacturing have their own performance requirements. For example, in stereolithography, the viscosity of the uncured resin must be sufficiently low that a fresh layer of resin may flow rapidly under the workpiece after each layer is deposited. Similarly low or lower viscosities are required for continuous processes. The resin must cure properly to add to the workpiece, preferably without distorting its shape significantly. The silica-based particles provided herein can promote these and other desirable properties in prepolymer systems for liquid based additive manufacturing.

In one embodiment, the silica-based particles can participate in cross linking the prepolymer composition during polymerization. For example, silica based particles may have groups Q, for example, acrylates and other double bond-containing groups, at their surfaces that can participate in polymerization. This provides a covalent interaction between the particle and the surrounding polymer. Triacrylates and other multifunctional groups can promote cross-linking as well. Such cross linking can provide additional mechanical strength beyond that provided by a particle that does not have reactive groups present at the surface.

Alternatively or in addition, the groups Q may participate in reactions that take place after additive manufacturing. For example, the prepolymer composition may have two or more different monomers or oligomers that polymerize via different mechanisms. The first monomer or oligomer may be polymerized during stereolithography, CLIP, DLS, or a similar process, for example, using a photoinitiator. The second monomer or oligomer may be polymerized during a post-deposition step, for example, using a thermally activated initiator. The groups Q could polymerize in this second polymerization step. Exemplary groups Q for this step include epoxies, isocyanates, and hydroxyl groups.

Alternatively or in addition, the groups Q may deliver additional co-monomer to the prepolymer composition that would otherwise be less soluble or miscible with the other components of the prepolymer composition. Even where the different monomers and oligomers are miscible, the cured polymers may not be, and the silica may act as a surfactant to prevent phase separation during polymerization.

Alternatively or in addition, the silica-based particles may be surface treated with reactive species that bring other functionality to the workpiece besides participating in polymerization. For example, where the prepolymer composition undergoes condensation polymerization, the silica-based particles may be surface treated with species that would otherwise promote the back (de-polymerization) reaction. Such particles can promote high temperature stability of the finished part by retarding decomposition or corrosion of the resin.

Alternatively or in addition, the silica-based particles could help prevent thermal degradation of the printed part simply by absorbing heat. Such applications may benefit from higher particle loadings to provide additional heat capacity. Non-aggregated colloidal silica, either on its own or in a silica-polymer composite, contributes less to viscosity build-up than a fumed or pyrogenic silica particle would, even with a similar surface treatment. The additional reinforcement or stiffness provided by the higher loadings can also help the finished part resist deformation at elevated temperatures.

Use of silica-based particles as described herein can also provide mechanical reinforcement to the polymerized resin. Silica-based particles may be incorporated at a loading level of 0.1 to 50 wt %, for example, from 1 to 40%, from 2 to 30%, or from 5 to 25%. Such reinforcement can increase properties such as tensile and/or flexural modulus, tensile and/or flexural strength, and elongation at break. For example, use of surface treated colloidal silica particles at a loading level of 5% can improve tensile modulus of a part fabricated with acrylic resin by at least 7%, for example, from 7% to 10% or from 7% to 15% with respect to a part fabricated without such particles. Likewise, the flexural modulus may be improved by at least 3.5%, for example, from 3.5% to 5% or from 3.5% to 8%. Use of silica-polymer composite particles at a loading level of 5% may increase tensile elongation at break by at least 20% with respect to an acrylic resin not containing such particles, for example, from 20% to 30%, or from 25% to 35% or 40%. The interaction of the silica-based particles with the polymer can be tailored by the choice of polymer and the surface treatment of the silica. Chemical interactions between the groups Q on the silica-based particles and the polymer can lead to cross-linking of the polymer. Depending on the frequency or concentration of such interactions, the particles can provide additional cross-linking in combination with traditional reinforcement to the resin. For example, even without cross-linking, the particles can increase fracture toughness and impact resistance by interrupting crack propagation. In some embodiments, the additional cross-linking provided a choice of a reactive group for Q can improve tensile properties in the fabricated part. In addition, because the particles alter the motion of the polymer chains, silica-based particles can be used to tune thermal properties such as glass transition temperature, low temperature brittleness, thermal expansion coefficient, or melting point, or to improve heat deflection performance. A surface treatment that can interact with the polymer matrix may enhance the reinforcement effect of the silica-based particle in comparison to the untreated particle. In some embodiments, surface treatments employing a group Q in which n is from 6 to 10 provide improved mechanical properties with respect to surface treatments not employing a group Q or in which n is 5 or less.

Nonetheless, the silica preferably does not dramatically increase the viscosity of the uncured resin. Such an increase in viscosity would make the resin more difficult to process using SLA, CLIP, or similar methods. In certain embodiments, use of silica does not increase the viscosity of the resin by more than 500 cP, for example, 450 cP or 350 cP, with respect to the unfilled resin.

Alternatively or in addition, the surface treating agent can improve the compatibility and/or dispersibility of the silica-based particle with the resin, the prepolymer or both. This can help the silica-based particles influence the surface appearance and other properties of the workpiece. The reinforcement provided by the silica-based particles can improve the scratch resistance of the printed part. By altering the flow properties of the prepolymer composition, they can also enable a smoother surface finish and reduce the contrast between individual polymer layers.

Surface treatment may also enhance other properties. For example, hydrophobized silica-based particles also retard the migration of moisture into the finished part to reduce swelling in humid environments. The surface chemistry can also be adjusted to provide chemical resistance, e.g., by selecting a surface treatment that is immiscible or has limited miscibility or solubility with chemicals expected to come into contact with the printed part. Alternatively or in addition, the silica based particles may be used at a sufficiently high loading to impart surface roughness or a matte finish to the finished part.

The silica-based particles may also facilitate leveling of the prepolymer composition. The rheology control provided by silica-based particles allows for rapid formation of a smooth layer of prepolymer under the workpiece. This improves throughput by decreasing the time for additional prepolymer composition to flow under the workpiece after a layer is deposited. It also enables formation of higher resolution features by allowing thinner layers of polymer to be deposited. In continuous processes, improved leveling increases throughput and resolution by preventing defects in the final piece due to uneven flow of the prepolymer composition.

The silica-based particles may also be used to disperse different components in the prepolymer formulation. For example, colloidal silica may be used to stabilize mixtures of different monomers or oligomers which might otherwise be immiscible, for example, via formation of particle stabilized emulsions. Alternatively or in addition, silica-based particles may be used to stabilize dispersion of other solid additives in the prepolymer composition. For example, the silica-based particles may have a surface treatment which reduces the interfacial energy between the solid additive and the monomers and/or oligomers in the prepolymer composition, thereby acting as a dispersant. Such additives may include glass fillers, ceramics such as alumina, zirconia, titania, lead zirconate titanates, silicon carbide, silicon nitride, aluminum nitride, tin oxide, magnesium sulfate, etc., metallic fillers, polymer fibers, clays, cellulose, and other additives known to those of skill in the art. Such additives may be in the form of relatively equiaxed particles or in the form of whiskers. Larger silica particles such as ADMA-FINE products from Admatechs Co. are available as powders and are also suitable for use in liquid based manufacturing processes as described herein.

The silica-based particles may also be used to manipulate the microstructure of the cured prepolymer composition. For example, the silica-based particles may be surface treated with a group such as an amine that scavenges the initiator. This will concentrate the initiator at the particles, varying the molecular weight of the cured polymer as a function of distance from the particles. In some embodiments, the molecular weight near the surface may be significantly lower than in the bulk of the material, providing a core-shell morphology to the finished part. Alternatively, the same chemistry may be used to improve the shelf life of the components for liquid based additive manufacturing. For example, where the initiator-bearing silica is mixed with the remaining components of the prepolymer composition shortly before use, the liquid components may be better able to resist polymerization during storage.

The silica-based particles may be used in combination with other components commonly used in liquid based additive manufacturing processes. For example, one or more of the additives listed above may be employed even if they are dispersed by some other mechanism than the silica-based particles provided herein. Alternatively or in addition, the prepolymer may include leveling agents, surfactants, plasticizers, or other polymers.

The silica-based particles may be used in any prepolymer composition suitable for use with stereolithography, CLIP, or DLS. While these processes are different, they operate on similar principles. A substrate is placed in contact with a prepolymer composition, e.g., in a reservoir, and the prepolymer composition is polymerized in an imagewise fashion by exposure to actinic radiation to start a workpiece by forming a layer of solid polymer on the substrate with a surface parallel to the substrate. The radiation may be delivered by a light source such as a laser that is rastered over the surface of the workpiece in a linear fashion or in a two dimensional pattern. In a layer-by-layer process such as SLA, the workpiece is then removed from the reservoir. Additional prepolymer composition is charged into the reservoir, the workpiece is replaced into the reservoir so the build surface contacts the prepolymer composition, and the prepolymer composition is again cured in an imagewise fashion to deposit additional solid polymer on the workpiece. The surface of the solidified prepolymer defines a build surface of the workpiece and of the final 3D printed part, and the part is built by building layers sequentially along an axis transverse to the cross-section. Each repetition of the process deposits a sequential portion of the three-dimensional object onto the workpiece. In a continuous process, the workpiece need not be removed from the reservoir until the three-dimensional object is formed. Rather, the prepolymer composition is cured in an imagewise fashion concurrently with the resupply of fresh prepolymer composition to the reservoir. The workpiece is translated away from the reservoir along an axis transverse to the substrate and the cross-sections. Thus, liquid prepolymer composition is always in contact with the workpiece, even as each subsequent sequential portion of the three dimensional object is formed by polymerization of the composition. As a result, fresh prepolymer composition comes in contact with the exposed build surface at the same time as prepolymer composition is polymerizing to form a solid. The workpiece is built up in a sequential fashion but individual "layers" are indistinguishable. Exemplary methods of performing additive manufacturing are described in U.S. Ser. No. 10/589,512, U.S. Ser. No. 10/792,855, U.S. Pat. Nos. 5,015,424, 5,151,813, and 9,034,236, the entire contents of both of which are incorporated herein by reference.

The present invention will be further clarified by the following examples which are intended to be only exemplary in nature.

EXAMPLES

Example 1

In this Example, colloidal silica was surface treated with an alkoxysilane having a methacrylate group.

A three-necked flask was charged with 547 g colloidal silica dispersion (115 nm diameter, pH 9.3, 40% solids), 469 g deionized water, and 573 mL isopropyl alcohol, followed by 2.7 g 3-methacryloxypropyltrimethoxysilane (MPS). The mixture was stirred for 4 hours at ambient temperature at 200-250 rpm. The heat was then ramped to 60° C. over 45 minutes and maintained for 1 hour 45 mins with stirring, after which an additional 10.9 g MPS was added and the mixture allowed to incubate a further six hours at 60° C. The mixture cooled overnight and was transferred to a large crystallizing dish, with additional isopropyl alcohol used to ensure the entire contents of the flask were removed. The mixture was heated on a hot plate at 120° C. with occasional manual stirring for several hours and then allowed to dry without further stirring at 90° C. overnight. Further drying was performed in an oven at 120° C. for six hours. The resulting white powder was milled in an IKA M20 Universal Mill (IKA Works, Inc., Wilmington, NC).

Example 2

In this example, the performance of various colloidal silicas and silica-polymer composites were evaluated in a commercial SLA process.

To form 5 wt % samples, 7.5 g of TG-C191 octyltrimethoxysilane treated colloidal silica (110-115 nm diameter, Cabot Corporation), TG-C110 hexamethyldisilazane (HMDZ) treated colloidal silica (110-115 nm diameter, Cabot Corporation), the MPS-treated colloidal silica of Example 1, silica-polymer composite particles having a particle size of 80 nm and produced according to U.S. Pat. No. 9,568,847, with MPS used as the first hydrophobizing agent and no second hydrophobizing agent, and Atlas 100 silica-polymer composite particles (Cabot Corporation) having an HMDZ surface treatment were dispersed in separate 142.5 g samples of clear acrylic resin for stereolithography (Formlabs, FLGPCL04 clear resin) using a Cole-Parmer ultrasonic processor at an amplitude of 30%, pulse interval of 2 s, and pulse duration of 5 s. To improve dispersion quality, the silica-based samples were added into the resin a little bit at a time at approximately 5 min intervals until all the silica-based powder was incorporated. The mixture was allowed to stand for about 15 min to cool and then transferred to the resin tank of a stereolithography 3D printer (Formlabs Form 2). 25 wt % samples were prepared using the same method with 37.5 g silica-based particles and 112.5 g resin. Neat resin samples were prepared as well; at least 150 g resin was charged into the tank of the 3D printer. Dogbone and bar shaped samples about 12-13 mm thick and 6.4-7 mm long were prepared with the axis of printing perpendicular to the angle at which samples were strained but in the plane of the sample.

Samples filled with 5 wt % composite particles were semi-transparent and samples prepared with 5% colloidal silica were opaque. However, the particles appeared well dispersed to the unaided eye in both samples. Likewise, good dispersion was observed in samples filled with 25 wt % colloidal silica. While the silica-polymer composite particles did not disperse well at 25 wt % loading, it is thought that additional sonication may improve dispersion.

Dogbone samples were subjected to tensile testing and exhibited brittle fracture, with smooth fracture surfaces. Addition of both colloidal silica and HMDZ-treated silica-polymer composite particles increased tensile strength and tensile modulus but generally reduced elongation at break. In addition, the use of colloidal silica and silica-polymer composite particles each increased the flexural modulus. These results were observed at both 5% and 25% loading for colloidal silica and at 5% loading of composite particles. At 5% loading, colloidal particles treated with MPS provided superior elongation at break, tensile modulus, and tensile strength in comparison to colloidal particles treated with octyltrimethylsilane. It is hypothesized that poor dispersion of the composite particles at 25% loading influenced the mechanical performance.

The use of colloidal silica and silica-polymer composite particles each had little effect on Shore A hardness.

Example 3

In this example, colloidal silica is modified with mercaptopropyl trimethoxysilane.

Mercaptopropyl trimethoxy silane (7.07 g) is added to a stirring mixture of 177.8 g (45% solids) Ludox CL-X colloidal silica dispersion (110-115 m$^2$/g, available from Sigma-Aldrich), 64 g of water, and 160 g of methanol. The mixture is then heated at 50° C. for 90 hr. The mixture is cooled to room temperature and dried under nitrogen without stirring under nitrogen at 90° C. overnight. Further drying is performed in an oven under nitrogen at 120° C. for six hours. The resulting white powder is milled in an IKA M20 Universal Mill (IKA Works, Inc., Wilmington, NC).

Example 4

In this example, colloidal silica is modified with an alkoxysilane having a methacrylate group.

A three-necked flask is charged with 547 g colloidal silica dispersion (100 nm diameter, pH 9.3-9.6, 40% solids), 469 g deionized water, and 573 g isopropyl alcohol, followed by 2.7 g 3-methacryloxypropyltrimethoxysilane (MPS). The mixture is stirred for 4 hours at ambient temperature at 200-250 rpm. The heat is then ramped to 60° C. over 45 minutes and maintained for 1 hour 45 mins with stirring, after which an additional 10.9 g MPS is added and the mixture allowed to incubate a further six hours at 60° C. The mixture cools overnight and is transferred to a large crystallizing dish, with additional isopropyl alcohol used to ensure the entire contents of the flask are removed. The mixture is heated on a hot plate at 120° C. with occasional manual stirring for several hours and then allowed to dry without further stirring at 90° C. overnight. Further drying is performed in an oven at 120° C. for six hours. The resulting white powder is milled in an IKA M20 Universal Mill (IKA Works, Inc., Wilmington, NC).

Example 5

In this Example, colloidal silica was surface treated with an alkoxysilane having a methacrylate group.

A three-necked flask was charged with 500 g colloidal silica dispersion (50 nm diameter, pH 9.3-9.6, 44% solids), 516.5 mL deionized water, and 573 mL isopropyl alcohol, followed by 3.6 g 3-methacryloxypropyltrimethoxysilane (MPS). The mixture was stirred for 4 hours at ambient temperature at 200-250 rpm. The heat was then ramped to 60° C. over 45 minutes and maintained for 1 hour 45 mins with stirring, after which an additional 14.6 g MPS was added with a syringe pump at 1 mL/min and the mixture allowed to incubate a further six hours at 60° C. The mixture cooled overnight and was transferred to a large crystallizing dish, with additional isopropyl alcohol used to ensure the entire contents of the flask were removed. The mixture was heated on a hot plate at 120° C. with occasional manual stirring for several hours and then allowed to dry without further stirring at 90° C. overnight. Further drying was performed in an oven at 110° C. for six hours. The resulting white powder was milled in an IKA M20 Universal Mill (IKA Works, Inc., Wilmington, NC).

Example 6

In this Example, colloidal silica was surface treated with an alkoxysilane having a methacrylate group.

A three-necked flask was charged with 851 g colloidal silica dispersion (115 nm diameter, pH 9.3, 40% solids) and 470 mL isopropyl alcohol, followed by 2.5 g 3-methacryloxypropyltrimethoxysilane (MPS). The mixture was stirred for 4 hours at ambient temperature at 200-250 rpm. The heat was then ramped to 60° C. over 45 minutes and maintained for 1 hour 45 mins with stirring, after which an additional 9.7 g MPS was added over five minutes and the mixture allowed to incubate a further six hours at 60° C. The mixture was spray dried to obtain a powder having a carbon content (Leco C-200 carbon analyzer) of 1.1 wt %.

Example 7

In this Example, stereolithography resins were filled with silica-based particles and used to form parts for mechanical testing.

To form 25 wt % masterbatches, 11 g each of the MPS-treated colloidal silica of Example 1 and of 80 nm silica-polymer composite particles having a particle size of 80 nm and produced according to U.S. Pat. No. 9,568,847 with MPS as the first hydrophobizing agent and no second hydrophobizing agent were dispersed in separate 33 g samples of clear acrylic resin for stereolithography (Formlabs, FLGPCL04 clear resin) by adding small amounts of the particles to the resin with manual mixing, followed by additional manual mixing for about 45 minutes. The mixture was then processed using a Cole-Parmer ultrasonic processor at an amplitude of 30%, pulse interval of 2 s, and pulse duration of 5 s for five minutes, followed by two minutes of manual mixing. The ultrasonic+manual mixing sequence was conducted five times. Letdowns containing 5% silica-based particles were prepared by combining 36 g of the masterbatch sufficient neat resin to make a 180 g mixture and stirring manually for at least 20 mins. The ultrasonication procedure employed for the masterbatch was then repeated for the letdown. The mixture was then transferred to the resin tank of a stereolithography 3D printer (Formlabs Form 2, 100 micron resolution). Neat resin samples were prepared as well; at least 150 g resin was charged into the tank of the 3D printer. Bar shaped samples with dimensions of 64.00 mm×12.80 mm×6.40 mm were prepared with their long axis parallel to the axis of printing for flexural testing. Dogbone shaped samples with dimensions of 57.15 mm×9.53 mm×2.03 mm were prepared with their long axis at about a 45° angle to the axis of printing but with the sample itself still in the plane of the printing axis. Samples with MPS-treated colloidal silica exhibited improved tensile modulus (1900 MPa) over the neat resin (1760 MPa) and improved flexural modulus (43433 MPa) over the neat resin (41685 MPa). Samples with silica-polymer composite particles showed improved tensile elongation at break (6.4%) with respect to the neat resin (5.0%). Neither set of experimental samples exhibited significant changes in flexural strength, flexural elongation, or tensile strength.

Example 8

Aqueous dispersions of colloidal silica having particle diameters of 23, 115, and 330 nm were employed (Table 1). A three-necked flask was charged with colloidal silica dispersion, deionized water, ammonium hydroxide, and isopropyl alcohol in that order as specified in Table 2, followed by a first treating agent (TA) charge of either 3-methacryloxypropyltrimethoxysilane (MPS) or 8-methacryloxyoctyltrimethoxysilane (MOS) (see Table 3). The mixture was stirred for 4 hours at ambient temperature at 200-250 rpm. The heat was then ramped to 60° C. over 30 minutes and maintained for 1 hour 30 mins with stirring, after which a second TA charge was added as specified in Table 2 and the mixture allowed to incubate a further six hours at 60° C. The total amount of treating agent added is equivalent to 4 molecules of TA per $nm^2$ of total silica surface area. The mixture cooled overnight and was transferred to a large crystallizing dish, with additional isopropyl alcohol used to ensure the entire contents of the flask were removed. For Samples 8-1, 8-2 and 8-5, the mixture was heated on a hot plate at 120° C. with occasional manual stirring for several hours and then allowed to dry without further stirring at 90° C. overnight. The resulting white cake was milled in an IKA M20 Universal Mill (IKA Works, Inc., Wilmington, NC). For Samples 8-3 and 8-4, the sample was repeatedly concentrated from multiple additions of IPA (150 ml each), each time bringing the sample to a wet paste by azeotropic removal of water before adding the next IPA portion. This is done a total of 6 times wherein after the last IPA addition an IPA dispersion largely free of water is obtained. The concentration of silica in the resulting dispersion is in Table 2.

TABLE 1

| Colloidal silica designation | Solids content in water | pH | BET ($m^2/g$) |
| --- | --- | --- | --- |
| 23 | 40.7% | 3.0 | 124 |
| 115 | 30.8% | 1.6 | 30 |
| 330 | 32.0% | 4.0 | 14 |

TABLE 2

| Sample | Silica Dispersion (g) | TA charge #1 (g) | TA charge #2 (g) | DIW (g) | IPA (ml) | 5N NH$_4$OH (g) | pH | Amount obtained (g) | Form |
| --- | --- | --- | --- | --- | --- | --- | --- | --- | --- |
| 8-1 | 324 | 1.2 | 3.7 | 2 | 163 | 2.6 | 9.3 | 92 | White powder |
| 8-2 | 389 | 1.9 | 5.7 | 3 | 196 | 3.1 | 9.6 | 126 | White powder |
| 8-3 | 246 | 5.1 | 15.4 | 81 | 163 | 2.6 | 9.1 | 320 | 35.5% in IPA |
| 8-4 | 246 | 6.6 | 19.7 | 115 | 248 | 2.6 | 9.2 | 458 | 26% in IPA |
| 8-5 | 313 | 0.6 | 1.7 | 14 | 163 | 2.6 | 10.2 | 101.3 | White powder |

TABLE 3

| Sample No. | Silica particle size | Treating Agent (TA) |
| --- | --- | --- |
| 8-1 | 115 | MPS |
| 8-2 | 115 | MOS |
| 8-3 | 23 | MPS |
| 8-4 | 23 | MOS |
| 8-5 | 330 | MPS |

Samples 8-1 through 8-5 were combined with photocurable resins as follows. For Samples 8-1, 8-2, and 8-5, 30 g of silica was combined with 570 g of Formlabs V4 clear photoresin in a FlackTek DAC600 Speedmixer with vacuum capability until visual inspection via an optical microscope of a small sample cast on a glass slide showed that the sample was dispersed. Specifically, six 15 mm yttria-stabilized zirconia grinding media (FlackTek), 85 g resin, and 5 g silica was charged into a Max 250 cup. The cup was covered and mixed for 30 s at 800 rpm, following which any material that built up along the sides of the cup was cleaned and added back into the resin. The 30 s/800 rpm/cleaning procedure was repeated, following which the resin mixture was mixed for three cycles of 2 minutes each at 2300 rpm, with 2 minutes cooling time following each mixing cycle.

The resin mixture was then degassed two cycles under 30 mBar or maximum vacuum power for 30 s at 1500 rpm and 7 min at 1000 rpm, with the resin mixture allowed to cool for two minutes following each 1000 rpm mixing pass. The ceramic media were strained out using a 125 micron paint screen and sufficient resin added to dilute the mixture to 5% silica. The let down was mixed at 1500 rpm for 30 s and then 1000 rpm for 7 minutes. Repeating the procedure provided sufficient 5% silica/resin mixture for additive manufacturing via SLA. For Examples 8-4 and 8-5, 570 g of Formlabs V4 clear photoresin was charged into a large crystallization dish, to which was added sufficient silica dispersion to provide 5% solids loading in the final IPA-free resin composition. The mixture was magnetically stirred and maintained overnight at 60° C., protected from light, with a slight purge of nitrogen gas sweeping the top of the crystallization dish.

A fumed silica treated with MPS (Aerosil R711 silica from Evonik Industries) was used to prepare a 5 wt % dispersion in acrylic resin. 30 g of silica was combined with 570 g of FormLabs V4 clear photoresin in a FlackTek DAC600 Speedmixer with vacuum capability until visual inspection via an optical microscope of a small sample cast on a glass slide showed that the sample was dispersed. Specifically, 95 g resin, and 5 g silica was charged into a Max 250 cup. The cup was covered and mixed for 30 s at 1500 rpm, following which any material that built up along the sides of the cup was cleaned and added back into the resin. The 30 s/1500 rpm/cleaning procedure was repeated. Once the silica was fully wet-out, six 15 mm yttria-stabilized zirconia grinding media (FlackTek), were added to the dispersion. The resin mixture was further mixed for three cycles of 2 minutes each at 2300 rpm, with 2 minutes cooling time following each mixing cycle. Finally, the ceramic media were strained out using a 125 micron paint screen. The procedure was repeated until sufficient 5% silica/resin mixture was obtained for additive manufacturing via SLA, approximately 600 g.

Viscosity properties of the uncured resin mixtures were measured in an AR2000ex rheometer (TA Instruments) using a 40 mm 2 degree cone, at 25 and 35° C. at shear rates of 0.01-1000 s$^{-1}$ and are in Table 4. The resin mixture was printed in a Form 3 SLA 3D printer (Formlabs) according to the manufacturer's directions to form shapes required for mechanical testing according to ASTM D638-14 (tensile and elongation testing), ASTM D790-03 (flexural properties), and ASTM D256-04 (Izod impact). For tensile testing, five dogbone-shaped samples were prepared with a length (z-axis during manufacturing) of 165 mm (gauge length of 50 mm), width of 13 mm, and thickness of 3.2 mm. Three rectangular samples (length=127 mm, width=12.7 mm, thickness=3.2 mm) were prepared for flexural testing. Ten rectangular samples (length=63.5 mm, width=12.7 mm, thickness=6 mm) were prepared for Izod impact testing. For the Izod impact test, the test pieces were printed with a notch having the size specified in the ASTM standard to improve reproducibility; the notch was not cut into the printed piece. Printed parts were cleaned with isopropyl alcohol in a Form Wash apparatus (Formlabs) for 10-15 min until they were no longer tacky. Following air drying for 30 min, the printed parts were post-cured in a Form Cure apparatus (Formlabs) for 30 min at 65° C. with additional light exposure at 405 nm.

TABLE 4

| Sample | Impact Strength (J/m) | Tensile Modulus (MPa) | Flexural Stress (MPa) | Flexural Modulus (MPa) | Viscosity at 100 s$^{-1}$, 25 C. (cP) | Viscosity at 100 s$^{-1}$, 35 C. (cP) |
|---|---|---|---|---|---|---|
| Resin only | 19.0 | 1835 | 96.1 | 2595 | 941 | 872 |
| 8-1 | 18.9 | 1932 | 101.8 | 2607 | 1142 | 481 |
| 8-2 | 22.9 | 1945 | 106.4 | 2714 | 1196 | 496 |
| 8-3 | 19.6 | 1994 | 109.5 | 2793 | 1211 | 524 |
| 8-4 | 19.9 | 1916 | 108.0 | 2753 | 1180 | 503 |
| 8-5 | n.d. | 1929 | 95.8 | 2495 | 1126 | 480 |
| R711* | 13.9 | 2149 | 116.4 | 3155 | 1465 | 622 |

*Comparative Example

The data in Table 4 show that the use of surface treated colloidal silica generally improved mechanical performance of the printed part without significantly adversely affecting resin viscosity. In contrast, the MPS treated fumed silica dramatically increased the viscosity of the resin at room temperature. Surface treatment of colloidal silica with MOS was superior to MPS for improving impact resistance on 23 and 115 nm core silica particles. Flexural modulus increases with decreasing particle size (increasing surface area) and MOS provides better performance that MPS on the 115 nm core silica. Tensile modulus increased for all silica samples over the clear resin.

Figure 1:
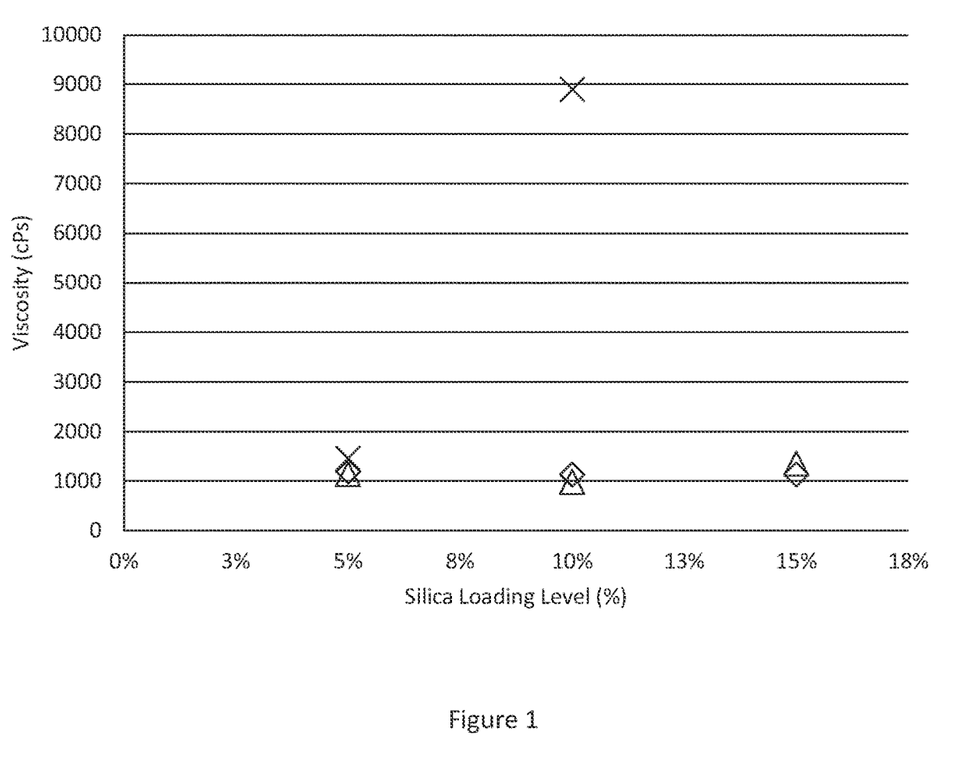
FIG. 1 is a graph showing the viscosity of silica dispersions in a UV cured acrylic resin at various loadings (x=fumed silica; diamond=Sample 8-1; triangle=Sample 8-2).

Additional dispersions were produced with 10% and 15% loading of Samples 8-1 and 8-2 and MPS-treated fumed silica using the methods outlined above, but with the quantity of resin adjusted appropriately. The viscosity of these dispersions at 25° C. at a shear rate of 100 s$^{-1}$ is shown in FIG. 1 (x=fumed silica; diamond=Sample 8-1; triangle=Sample 8-2) and demonstrate that the thixotropic effects of fumed silica increase viscosity dramatically as loading is increased, while the resin dispersions with colloidal silica show relatively little change in viscosity with loading. An additional dispersion with 20% loading of Sample 8-1 was prepared at a lower scale but using a similar method to that outlined above and exhibited similarly low viscosity, about 1250 cP.

Figure 2A:
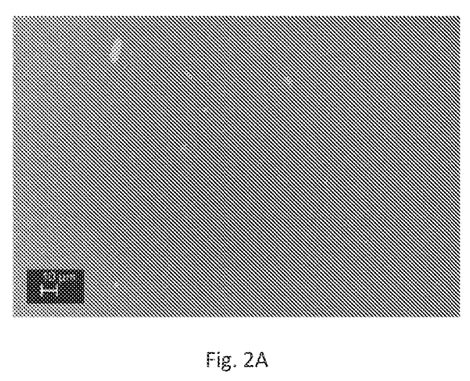
FIGS. 2A, 2B, 2C and 2D are scanning electron micrographs of UV cured acrylic resin containing silica particles that have been surface treated with 3-methacryloxypropyltrimethoxy silane.
Figure 2B:
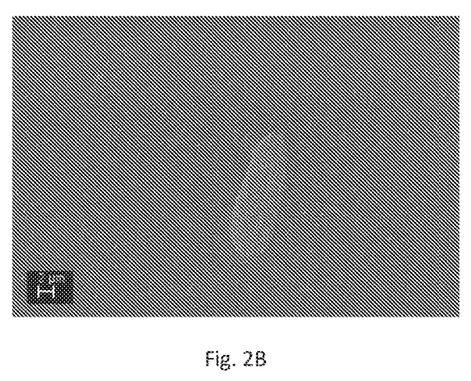
Figure 2C:
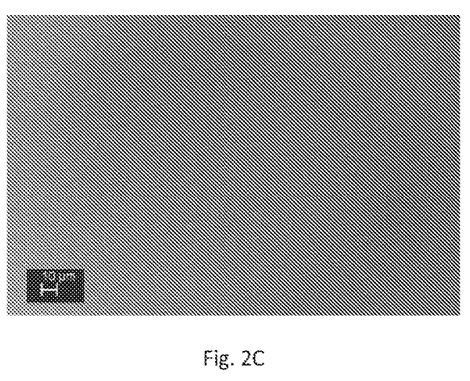
Figure 2D:
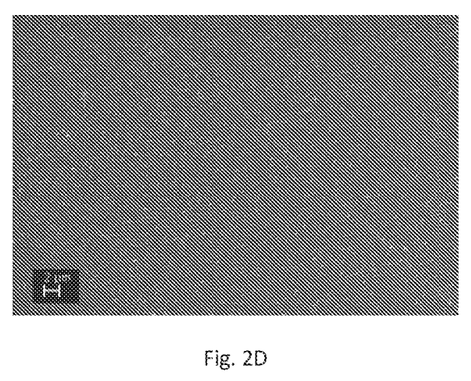
Figure 3A:
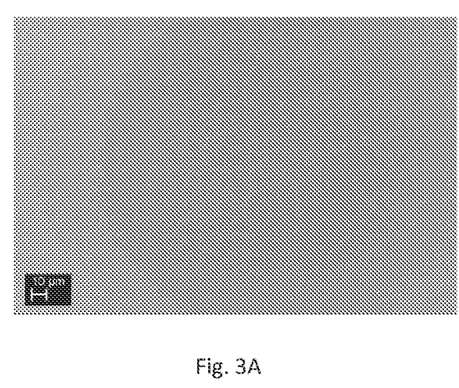
FIGS. 3A, 3B, 3C, and 3D are scanning electron micrographs of acrylic resin containing silica particles that have been surface treated with 8-methacryloxyoctyltrimethoxy silane (FIGS. 3A and 3B) and 3-methacryloxypropyltrimethoxy silane (FIGS. 3C and 3D).
Figure 3B:
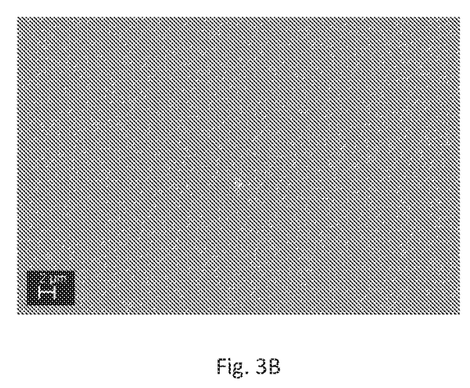
Figure 3C:
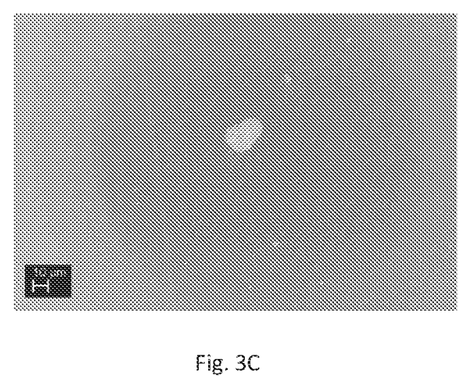
Figure 3D:
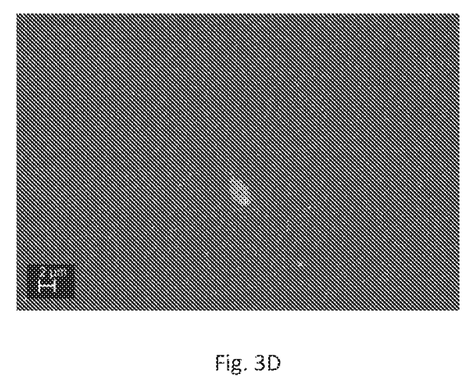

The quality of silica dispersion in resin were evaluated by SEM imaging of printed 3D parts. Samples were cut to expose a cross section and then embedded and cured in SPI PON812 epoxy. The cut surface was polished to a final finish of 50 nm using a series of silicon carbide abrasive discs (Ted Pella, Inc.) and alumina polishing slurries (for finish quality of 5 microns and finer) (manufactured by Pace Technologies). The sample was bath sonicated and rinsed with running water to remove debris from polishing. After a final rinse in isopropanol and drying, the surface was sputter coated with sufficient platinum to impart conductivity during SEM imaging using a Denton Desk V sputter coater. In-lens secondary electron SEM images were taken using a Zeiss UltraPlus Field Emission SEM operating at 1 kV/30 um aperture at ~3-3.5 mm working distance. Images were saved in TIFF format at 1024×768 pixel resolution. Low magnification images (1000×) were collected using the Line Integration setting in the SEM at scan speed 6 with N=30 for noise reduction. 5K and 25K images were taken using the Frame Integration setting at scan speed 3 with N=50. This was to reduce pixel dwell time and hence, charging effects and beam damage/contamination deposition that were seen with line integration. Resins prepared from IPA dispersions of MPS-treated colloidal silica (Sample 8-3) showed very well dispersed single particles with essentially no agglomeration (FIGS. 2A and 2B). Dispersing dry silica (e.g., Sample 8-1) into resin requires strong mechanical, high shear mixing to reach good dispersion but several agglomerates can still be seen in the cured parts (FIGS. 2C and 2D). MOS-treated 115 nm particles (FIGS. 3A and 3B) disperse more readily in resin than the corresponding MPS-treated 115 nm particles (FIGS. 3C and 3D) (Samples 8-3 and 4).

Example 9

The colloidal silica of Sample 8-1 and TG-C110 silica were combined with Formlabs Flexible 80A resin using the same method and proportions as was used to combine silica with the V4 resin in Example 8. Viscosity of the uncured resin was measured at 25 and 35° C. at 100 $s^{-1}$ and 1000 $s^{-1}$ as described in Example 8 (Table 5). 3D printed samples were produced as described in Example 8.

TABLE 5

| Sample | Viscosity (cps) | | | | Tensile Strength (MPa) |
| --- | --- | --- | --- | --- | --- |
| | 100 $s^{-1}$ @ 25° C. | 1000 $s^{-1}$ @ 25° C. | 100 $s^{-1}$ @ 35° C. | 1000 $s^{-1}$ @ 35° C. | |
| Neat Resin | 3376 | 3165 | 1805 | 1749 | 2.0 |
| Sample 8-1 | 3840 | 3465 | 2063 | 1939 | 3.0 |
| TG-C110 | 3745 | 3486 | 2063 | 1939 | 1.8 |

While addition of silica to the flexible resin increases viscosity, the increase is not so great that the resin cannot be printed. The resulting 3D printed parts exhibit increased stiffness (modulus) with respect to parts printed with the neat resin as a result of the silica reinforcement (about 6.1-6.2 MPa with colloidal silica vs. 4.9 MPa without), but the printed part with Sample 8-1 exhibited higher tensile strength than the part with TG-C110 silica.

Example 10

In this Example, colloidal silica was surface treated with an alkoxysilane hydrolysate having methacrylate groups.

A three-necked flask was charged with 382 g colloidal silica dispersion (115 nm diameter, pH 2.5, 31.4% solids), 10 g deionized water, and then 3.12 g of 5N $NH_4OH$. The final pH was 9.5-9.8. To this stirred mixture is added 196 mL isopropyl alcohol, followed by 6 g methacryloxypropyltrimethoxysilane, oligomeric hydrolysate (H-MPS, 1000-3000 cSt, Gelest). The mixture was stirred for 4 hours at ambient temperature at 200-250 rpm. The heat was then ramped to 60° C. over 45 minutes and maintained for 7 hour 30 mins with stirring. The mixture cooled overnight and was transferred to a large crystallizing dish, with additional isopropyl alcohol used to ensure the entire contents of the flask were removed. The mixture was heated on a hot plate at 120° C. with occasional magnetic stirring for several hours and then allowed to dry without further stirring at 120° C. overnight. The resulting white powder was milled in an IKA M20 Universal Mill (IKA Works, Inc., Wilmington, NC) to produce about 125 g of a fine white powder.

Example 11

In this Example, colloidal silica was surface treated at low pH with an alkoxysilane having a methacrylate group.

A three-necked flask was charged with 382 g ion exchanged colloidal silica dispersion (115 nm diameter, pH 2, 31.4% solids), 10 g deionized water, and 196 mL isopropyl alcohol, followed by 4.7 g 3-methacryloxypropyltrimethoxysilane (MPS). The mixture was stirred for 4 hours at ambient temperature at 200-250 rpm. The heat was then ramped to 60° C. over 45 minutes and maintained for 7 hour 30 mins with stirring. The mixture cooled overnight and was transferred to a large crystallizing dish, with additional isopropyl alcohol used to ensure the entire contents of the flask were removed. The mixture was heated on a hot plate at 120° C. with occasional manual stirring for several hours and then allowed to dry without further stirring at 120° C. overnight. The resulting white powder was milled in an IKA M20 Universal Mill (IKA Works, Inc., Wilmington, NC).

Example 12

Solid-state $^{29}Si$ cross-polarization magic-angle spinning (CP/MAS) NMR spectra of samples as shown in Table 6 were recorded at 9.4 T (79.49 MHz for $^{29}Si$ and 400.19 MHz for $^1H$) using a Bruker Avance 11-400 spectrometer with a 4-mm double resonance MAS probe. Linear ramp of proton channel RF amplitude from 70% to 100% during the cross-polarization contact time was used for achieving good and stable Hartmann-Hahn matching condition at the magic angle spinning speed of 8 kHz. The $^{29}Si$ RF field optimized for the Hartmann-Hahn match is 49 KHz. The contact time for $^{29}Si$ CP/MAS measurements were set as 10 ms. Composite pulse proton decoupling (TPPM) with a field strength of 42 kHz was applied during the data acquisition period. Typically, 2000 repeated scans with a recycle delay of 3 seconds were used to acquire the data. All of the NMR measurements were performed at room temperature. The $^{29}Si$ chemical shifts are referenced to tetramethylsilane using an external standard of tris(trimethylsilyl)silane. The results in Table 6 (units=molecules of treating chemical per $nm^2$ of silica surface) show that the surface treating agent covalently attached to the silica via siloxane bonds.

TABLE 6

| Sample | Example 6 | Sample 8-1 | Sample 8-2 | Example 11 | Example 10 |
| --- | --- | --- | --- | --- | --- |
| T1 | 0.022 | Not measured | 0.003 | 0.028 | 0.046 |
| T2 | 0.261 | 0.308 | 0.211 | 0.441 | 0.181 |
| T3 | 1.049 | 0.59 | 0.25 | 0.299 | 0.555 |
| T3/T2 | 4.0 | 1.9 | 1.2 | 0.7 | 3.1 |
| Total T | 1.3 | 0.99 | 0.46 | 0.77 | 0.78 |

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of forming a three-dimensional object, comprising:
   a) contacting a substrate with a reservoir of prepolymer composition, the prepolymer composition comprising a resin comprising monomers and oligomers of polymers selected from acrylates, methacrylates, vinyl polymers, olefins, silicones, and epoxies and silica-containing particles selected from i) 0.1-50 wt % colloidal silica particles having a particle size of 5 nm-600 nm treated with at least one surface treatment agent, and ii) 0.1-50 wt % silica-polymer composite particles having a particle size of 10 nm-3 microns and comprising colloidal silica particles treated with at least one surface treatment agent, wherein the surface treatment agent comprises an organopolysiloxane, an organosiloxane, an organosilane, a haloorganosilane, or an organosilazane, and wherein the prepolymer composition has a viscosity no more than 500 cP greater than the neat resin at a temperature of 25° C. and a shear rate of 100 s$^{-1}$;
   b) selectively exposing the prepolymer composition imagewise to actinic radiation to form solid polymer at the substrate and having a build surface parallel to the substrate, the solid polymer being a sequential portion of the three-dimensional object;
   c) contacting the build surface with the prepolymer composition;
   d) selectively exposing the prepolymer composition to actinic radiation to increase the mass of the solid polymer, the additional polymer being a subsequent sequential portion of the three-dimensional object and
   e) repeating steps c) and d) until the three dimensional object is formed.

2. The method of claim 1, wherein the surface treatment agent comprises a hydroxy-substituted or terminated siloxane oligomer having 7 to 14 mers or a cyclic siloxane having 4-14 silicon atoms in the ring.

3. The method of claim 1, wherein the surface treatment agent comprises $R^1Si[(OR^2)_xR^3_{3-x}]$ wherein $R^1$ is selected from the group consisting of $C_1$-$C_{30}$ branched and straight chain alkyl, alkenyl, and $C_3$-$C_{10}$ cycloalkyl, $C_6$-$C_{10}$ aryl, and $R^4Q$, where $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3, hexamethyldisilazane, or dimethyldichlorosilane.

4. The method of claim 1, wherein the surface treatment agent comprises a polysiloxane oligomer or co-oligomer of at least one group $[R^3_{3-x}(OR^2)_x]SiR^4Q$ having a viscosity of 4-3500 cSt, wherein $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3.

5. The method of claim 4, wherein the polysiloxane oligomer or co-oligomer has a viscosity of 500-3500 cSt.

6. The method of claim 1, wherein the silica-containing particles are silica-polymer composite particles.

7. The method of claim 6, wherein the silica-polymer composite particles comprise a plurality of silica particles and a polymer matrix, wherein the silica particles are surface-modified with a first hydrophobizing agent comprising $[R^3_{3-x}(OR^2)_x]SiR^4Q$, wherein $R^4Q$, where $R^4$ is an alkyl linker with the general formula $C_nH_{2n}$, where n=0-10, and Q is an epoxy, thiol, or a substituted or unsubstituted vinyl, allyl, acrylate ester, or methacrylate ester group, $R^2$ and $R^3$ are independently methyl or ethyl, and x is 1, 2, or 3.

* * * * *